United States Patent
Benz et al.

(10) Patent No.: US 10,461,382 B2
(45) Date of Patent: Oct. 29, 2019

(54) RECEPTACLE FOR A BATTERY MODULE AND BATTERY MODULE HAVING SUCH A RECEPTACLE

(71) Applicant: Robert Bosch GmbH, Stuttgart (DE)

(72) Inventors: Steffen Benz, Stuttgart (DE); Dirk Liepold, Fellbach (DE); Eduard Reimer, Stuttgart (DE); Ionut Marian Lica, Schwieberdingen (DE); Jochen Schweinbenz, Stuttgart (DE); Jonas Schuetz, Stuttgart-Bad Cannstatt (DE); Kushtrim Krasniqi, Stuttgart (DE); Lukasz Paczkowski, Stuttgart (DE); Markus Kohlberger, Stuttgart (DE); Nicolai Joerg, Stuttgart (DE); Ulrich Lange, Aichtal (DE)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 15/525,680

(22) PCT Filed: Oct. 19, 2015

(86) PCT No.: PCT/EP2015/074168
§ 371 (c)(1),
(2) Date: May 10, 2017

(87) PCT Pub. No.: WO2016/074885
PCT Pub. Date: May 19, 2016

(65) Prior Publication Data
US 2017/0324130 A1    Nov. 9, 2017

(30) Foreign Application Priority Data
Nov. 12, 2014  (DE) .......................... 10 2014 223 047

(51) Int. Cl.
*H01M 10/6556* (2014.01)
*H01M 2/10* (2006.01)
(Continued)

(52) U.S. Cl.
CPC ..... *H01M 10/6556* (2015.04); *H01M 2/1077* (2013.01); *H01M 10/625* (2015.04); *H01M 10/647* (2015.04); *H01M 2220/20* (2013.01)

(58) Field of Classification Search
CPC ......... H01M 10/6556; H01M 10/0468; H01M 10/0481
See application file for complete search history.

(56) References Cited

U.S. PATENT DOCUMENTS 4,100,333 A * 7/1978 Haas .................. H01M 2/0245
429/156
2011/0183179 A1    7/2011 Okada
(Continued)

FOREIGN PATENT DOCUMENTS

DE    102010046529    3/2012
DE    102014216407    2/2016
(Continued)

OTHER PUBLICATIONS

International Search Report for Application No. PCT/EP2015/074168 dated Jan. 14, 2016 (English Translation, 2 pages).

*Primary Examiner* — Maria Laios
(74) *Attorney, Agent, or Firm* — Michael Best & Friedrich LLP

(57) ABSTRACT

The invention relates to a receptacle (34) for at least partially compressively receiving at least one battery cell (12) for a battery module, wherein the receptacle (34) has at least two end plates (10) which can be arranged on two opposing sides of the at least one battery cell (12), wherein the end plates (10) are connected to one another by a plurality of connect-
(Continued)

ing means (24), which are fixed to the end plates (10) and in each case have at least two plug elements (28), in such a way that the plug elements (28) of the connecting means (24) for fixing the connecting means (24) to the end plates (10) engage in bushings (22) of the end plates (10) in a plane arranged substantially at right angles to the direction of extension of the connecting means (24). In summary, a receptacle (34) of the type described above allows battery cells (12) in a particularly simple and cost-effective manner to be fixed in a battery module and allows the performance of a battery module to be maintained, irrespective of the temperature, by at least temporary bracing.

10 Claims, 4 Drawing Sheets

(51) Int. Cl.
*H01M 10/647* (2014.01)
*H01M 10/625* (2014.01)

(56) References Cited

U.S. PATENT DOCUMENTS

| | | | |
|---|---|---|---|
| 2012/0231319 A1* | 9/2012 | Buck | B60L 11/1874 429/120 |
| 2012/0315508 A1 | 12/2012 | Kurita | |
| 2013/0017436 A1* | 1/2013 | Kume | H01M 2/206 429/159 |
| 2013/0183571 A1 | 7/2013 | Miyazaki et al. | |
| 2013/0273412 A1 | 10/2013 | Okada et al. | |
| 2013/0330587 A1 | 12/2013 | Takahashi et al. | |

FOREIGN PATENT DOCUMENTS

| | | | |
|---|---|---|---|
| EP | 2323194 | 5/2011 | |
| EP | 2388845 | 11/2011 | |
| EP | 2819210 | 12/2014 | |
| EP | 3178123 A1 | 6/2017 | |
| JP | 2013214497 A | 10/2013 | |
| JP | 2014-044884 * | 3/2014 | ............ H01M 2/10 |
| JP | 2014044884 | 3/2014 | |
| WO | 2013145917 A1 | 10/2013 | |

* cited by examiner

RECEPTACLE FOR A BATTERY MODULE AND BATTERY MODULE HAVING SUCH A RECEPTACLE

BACKGROUND OF THE INVENTION

The present invention relates to a receptacle for a battery module, in particular for fixing and, where appropriate, pressing in at least one battery cell. The present invention further relates to a battery module having such a receptacle, at least one battery cell having been arranged in the receptacle.

Electrochemical energy-storage devices, such as lithium-ion batteries for example, are widely used in many everyday applications. They are employed, for example, in computers, such as laptops for instance, in mobile phones, in smart phones and in other applications. Such batteries also offer advantages in connection with the electrification—currently being driven forward at great speed—of vehicles such as motor vehicles, for instance in the case of electric vehicles or hybrid vehicles.

Lithium-ion batteries, for example, for the automobile field of application for instance, often comprise a plurality of individual battery cells. In order to increase the level of voltage or current, these cells are interconnected in parallel or in series and combined mechanically to form modules. In this case the cells often include a metallic housing in which the cell units, for example comprising electrodes of coiled configuration, are located.

The cell units arranged in the housings can often swell up or expand in the event of an increase in temperature or as a consequence of a charging or discharging process. As a result, the internal resistance of the cell becomes greater, and the performance thereof declines. Therefore it is known to apply a force to the module from outside with the aid of a tightening strap, in order in this way to press the cells together and to prevent the swelling. Alternatively, it is known that the battery cells are surrounded by a frame which counteracts a cell expansion. Such frames often consist of welded components, or likewise exhibit tightening straps.

From document DE 10 2010 046 529 A1 a quadrangular frame system is known for accommodating at least one battery cell. Such a frame system exhibits two pressure plates and also two side parts, the two side parts having been fixed to the two pressure plates.

From DE 10 2014 216 407, which is not a prior publication, a receptacle is furthermore known for the at least partially pressing accommodation of at least one battery cell for a battery module, said receptacle exhibiting two end plates which can be arranged on two opposing sides of the at least one battery cell, said end plates having been connected by a plurality of rod-like supports fixed to the end plates, and said supports having been configured for the at least two-dimensional support of, in each instance, an edge of the at least one battery cell.

SUMMARY OF THE INVENTION

The present invention relates to a receptacle for the at least partially pressing accommodation of at least one battery cell for a battery module, said receptacle exhibiting at least two end plates which can be arranged on two opposing sides of the at least one battery cell. In this case the invention provides that the end plates have been connected by a plurality of connecting means, fixed to the end plates and each exhibiting at least two plug-in elements, in such a manner that for the purpose of fixing the connecting means to the end plates the plug-in elements of the connecting means engage with sockets of the end plates extending in a plane arranged substantially at right angles to the direction of extent of the connecting means.

Such a solution permits, in particular, a lightweight and inexpensive receptacle to be created for the purpose of forming a battery module, by which a deterioration of the performance of the battery module by virtue of an expansion or swelling of the battery cell or battery cells can be prevented.

The receptacle described above consequently serves, in particular, for the at least partially pressing accommodation of at least one battery cell. In particular, the receptacle can serve to accommodate a plurality of battery cells which, through an appropriate interconnection amongst themselves, in particular together with the receptacle, form a battery module. By an "accommodation" of the battery cell or battery cells it is consequently to be understood that the battery cell or battery cells has/have been arranged in the receptacle or is/are at least partially surrounded by the receptacle. Furthermore, by an "at least partially pressing accommodation" it is to be understood that the at least one battery cell does not need to be pressed in permanently but only in a certain operating condition of the battery cell, such as, for instance, in an operating condition in which an expansion of the at least one battery cell takes place. Consequently a "partial pressing" may mean, for instance, a temporary pressing.

The receptacle exhibits two end plates which can be arranged on two opposing sides of the at least one battery cell. Consequently one battery cell may have been arranged between the end plates, or a plurality of battery cells may have been arranged between the end plates, without any battery cell needing to be in direct contact with one end plate or with both end plates. In this connection, in the case where a plurality of battery cells are present the end plates may, in particular, have been arranged in such a manner that they are present in each instance at the end of an array or of a stack of the battery cells and, for instance, are in contact with the corresponding outer battery cells. Consequently an end plate may then have been arranged in each instance in front of the first and behind the last battery cell. In this case the end plates may have been configured or dimensioned in such a manner that they are able to support the entire battery cell or the entire side of the battery cell bearing against the end plate.

Consequently the end plates may, in particular, perform the task of a pressure plate, in order in this way to enable an at least partial or temporary bracing of the at least one battery cell. Such a bracing may in this case serve, in particular, to counteract a, for example, temperature-induced swelling of the battery cells, as a result of which the internal resistance of the cell is increased and the performance thereof declines. A swelling in this case may be brought about, for example, by an evaporation or by a decomposition of electrolytes contained in the cell, or even by charging or discharging processes.

In the case of a previously described receptacle, the invention provides, moreover, that the end plates have been connected by a plurality of connecting means fixed to the end plates. In other words, the receptacle includes a plurality of connecting means which have been fixed to the end plates and consequently connect them. As a result, the receptacle can form a stable and self-supporting structure which can exert a tightening force on the battery cells.

The connecting means in this case are, for example but not restrictively, of rod-like configuration, which in the sense of the present invention is intended to mean, in particular, that the connecting means exhibit, in comparison with their length extending between the end plates, a smaller and therefore only a limited width, and consequently the individual connecting means are spaced from one another. In particular, by "a rod-like support" it is to be understood that this is present only in a limited region of the receptacle and, for instance, does not form an entire lateral face but, for example, is present only in a corner region of the receptacle.

By virtue of the fact that the connecting means are of rod-like configuration, a very stable connection can be combined with a particularly easy connection. This is because, by virtue of the only limited spatial extent, the connecting means have only a limited material requirement, so weight can be saved. This is an advantage, particularly for mobile applications, for instance in connection with use in an at least partially electrically propelled vehicle.

In addition, by virtue of a saving of material and, furthermore, a reduction or simplification of components that is achieved in comparison with solutions from the prior art, a particularly inexpensive configuration may be possible.

However, a rod-like configuration is not mandatory, so even non-rod-like configurations are encompassed by the scope of the invention.

Furthermore, a particularly good stability can be made possible, since force influences acting on the receptacle from outside can be diverted well via a framework, formed by the receptacle, of, in particular, rigidly connected parts.

With reference to the fixing of the connecting means to the end plates, the end plates each exhibit at least two sockets extending in a plane arranged substantially at right angles to the direction of extent of the connecting means. For example, the sockets may extend in a direction disposed from a top region to a bottom region of the end plates. The "direction of extent of the connecting means" in this case is intended to mean, in particular, their length and therefore the direction from one end plate to the other end plate.

Consequently these sockets have, in particular, been arranged in the interior of the end plates or fastened to said end plates, and can ensure a stable and space-saving fastening of the connecting means. In order to realize this, the connecting means each exhibit at least two plug-in elements in such a manner that for the purpose of fixing the connecting means to the end plates the plug-in elements engage with the sockets.

By a "plug-in element" in this connection, an element may be understood that can be plugged into the socket and in this way can fix the connecting means. In this case the invention provides, for example, that the plug-in elements have been configured as part of the rod-like connecting means and, for example, have been configured in one piece with said connecting means. As a result, production can be particularly simple. Since the plug-in elements engage with the sockets, the plug-in elements also extend in a plane arranged substantially at right angles to the direction of extent of the connecting means, in which connection the exact orientation of the plug-in elements and of the sockets with respect to one another may have been adapted.

In a finished module the connecting means extend approximately in a direction that extends from the upper side of the battery cells to the underside thereof. In this case an orientation substantially at right angles to a direction of extent of the connecting means is intended to signify an exact right angle or an angle that may exhibit a deviation from a right angle of ±30°, in particular ±15°, for example ±5°. In this configuration a particularly stable fixing of end plates and supports can be realized, a secure fixing being realized solely by the plugging-in of the plug-in elements and without the mandatory provision of further fixing elements, the latter possibility, however, not being excluded within the scope of the invention.

Consequently, given the presence of the end plates and of the connecting means, the receptacle can be produced in straightforward manner by merely being plugged together. A process for assembly as well as a process for disassembly of the receptacle may therefore proceed in particularly straightforward and temporally economical manner, so production and also service work can proceed particularly easily.

Furthermore, such connecting means can be produced easily and cost-effectively, so the receptacle can be comparatively inexpensive. By virtue of the arrangement of the sockets, the arrangement can, furthermore, be particularly stable, since forces introduced from outside can be safely absorbed.

In this case the invention may, for example, provide that the connecting means have been configured to be, for example, angular parallel to their direction of extent or exhibit an angle parallel to their direction of extent, in order in this way to have been configured for the at least two-dimensional supporting of, in each instance, an edge of the at least one battery cell. In other words, the connecting means may be configured in such a manner that the edges of a battery cell, particularly in the case of plate-like battery cells, are supported in two dimensions or in two planes. In this case the dimensions or planes to be supported have been arranged, in particular, at a right angle to the support provided by the end plates. Consequently, in an interaction of the connecting means and the end plates jointly a three-dimensional and therefore complete support of the battery cells can be made possible.

As a result, the battery cell or battery cells is/are fixed securely in all directions in space. Consequently the situation can be prevented where a defined initial tension needs to be present already in a normal condition of the battery cells—that is to say, in a condition without expansion. This permits a sparing of the battery cells and, as a result, a particularly advantageous longevity of the battery cells and therefore of the battery module. In other words, the disadvantage of the solutions from the prior art can be circumvented, according to which the base of the module was often designed to be open and, as a result, battery cells could come loose from the composite system without an initial tension. However, attention is drawn to the fact that, although the provision of an initial tension also in a normal condition is not necessary within the scope of the present invention, it is also not ruled out.

In this case, however, a rod-like configuration of the supports is not a disadvantage, since the battery cells undergo a charge-state-dependent or temperature-dependent bulging often only in the dimension of the support of the end plates. Consequently a full-area support by the end plates may be sufficient for avoiding or for counteracting an expansion of the battery cells.

Moreover, the previously described receptacle is suitable, in principle, for the most diverse configurations of battery cells. For instance, bulbous or convex cells, as well as concave cells, may find application, in which case, in principle, a minimum pressing force is not necessary for all cells.

Furthermore, such a receptacle can, for instance, be produced through the use of, for example, standardized profiles available as standard which can be connected to the end plates positively or by adhesive closure, for instance with the aid of sockets described below. In this case, laser welding, which can be costly and really complex by virtue of comparatively large chains of tolerance, can be dispensed with.

Summing up, a receptacle described above permits battery cells to be fixed in a battery module in particularly straightforward and inexpensive manner, and permits the capacity of a battery module to be maintained independently of the temperature by an at least temporary bracing.

Within the scope of one configuration, the sockets may pass completely through the end plates. In particular in this configuration, a high stability can be combined with a high variability. This is because in this configuration the plug-in elements may likewise also pass through the end plates completely or at least to a great extent, which may significantly enhance the stability of the link. In addition, the plug-in elements can enable the fixing of a plurality of end plates arranged on top of one another if the sockets of the end plates have been arranged in alignment and the plug-in elements exhibit a sufficient length.

In particular with respect to a high variability, the invention may provide that at least four end plates arranged in pairs have been provided, two of which in each instance have been positioned above one another with sockets arranged in alignment. In this configuration, as explained above, it may be advantageous if the plug-in elements exhibit a sufficient length in order to have been positioned in several sockets, since in this way a simple fixing of several end plates by a comparatively small number of connecting means is possible. "Four end plates arranged in pairs" in this case may mean, in particular, that in each instance two end plates have been arranged in a pair and therefore in such a manner in order, as a pair of end plates, to press at least one battery cell between themselves. Consequently, in this configuration two modules of battery cells can be arranged one above the other.

Within the scope of a further configuration, at least four end plates arranged in pairs may have been provided, two of which, in each instance, have been positioned side by side with sockets arranged in parallel. Also in this configuration a high variability can be made possible, and furthermore a large number of battery cells, or a plurality of modules, such as, in particular, at least two modules arranged side by side, can be arranged in stable and inexpensive manner.

Within the scope of a further configuration the invention may provide, furthermore, that the sockets have been formed from a metallic material—that is to say, from a material that contains a metal or a metal alloy, for instance from steel. This configuration may be an advantage, particularly when the end plates have been formed from a synthetic material. By virtue of the configuration of the socket from a metallic material, an application of force to the material of the end plates themselves can be reduced, as a result of which damage to the end plates can be prevented or at least significantly reduced, even in the case of a comparatively large application of force. A configuration of the end plates from a synthetic material, such as PTFE for example, can enable a particularly weight-reduced configuration, which may be an advantage, particularly in mobile applications. In addition, a sufficient stability may also be formed by plastic plates, so that a secure bracing or fixing of the battery cells is possible.

Within the scope of a further configuration, the end plates may exhibit a honeycomb-like structure, at least partially. In particular, through the provision of a honeycomb-like structure the end plates may have a particularly low weight and nevertheless may have great stability at the same time. In this case, by a "honeycomb-like structure" may be understood, in particular, a structure that exhibits recesses directly adjacent to one another, in particular in hexagonal form. In this case the hexagonal recesses have been bounded by, for example, frames that, with the exception of the outer frames, are each to be assigned to at least two hexagonal recesses. In this case such structures may have been provided, in particular, on a surface that has been provided to be arranged on the side opposite the battery cell.

Within the scope of a further configuration, the connecting means may have been formed from a metallic material— that is to say, from a material that contains a metal or a metal alloy. For example, the connecting means may have been formed from steel. In this configuration a particularly high stability of the receptacle can be realized. Furthermore, in this case the receptacle may, despite the metallic implementation of the connecting means, have a low weight by virtue of its rod-shaped configuration, since only a comparatively small amount of material needs to be used for the connecting means.

With regard to further technical features and advantages of the receptacle according to the invention, reference is hereby made explicitly to the explanatory remarks in connection with the battery module according to the invention, the figures and also the description of the figures.

The present invention provides, furthermore, a battery module with at least one battery cell, in particular with a plurality of battery cells, said battery module exhibiting at least one receptacle, configured as described above, for accommodating the at least one battery cell.

Summing up, in particularly simple and cost-effective manner a battery module described above permits battery cells to be fixed and, by virtue of an at least temporary bracing, permits the capacity of the battery cells, and therefore of the battery module, to be maintained independently of the temperature.

Within the scope of one configuration, at least one temperature-control element may have been provided which may exhibit sockets arranged in alignment with the sockets of at least one end plate, preferentially of at least two end plates, in which case the plug-in means of at least one connecting means lead through the sockets of the temperature-control element. In this configuration, in addition to the battery cells a temperature-control element can be fixed by the corresponding connecting means, further simplifying the structure of the battery module and therefore enabling production in particularly straightforward and inexpensive manner. Alternatively, the invention may provide that at least one temperature-control element serves as connecting means. In this configuration the temperature-control element consequently exhibits as connecting means at least two plug-in elements which can be guided into the sockets of the end plates. In other words, the connecting means may have been configured as a temperature-control element and, for example, may exhibit a plate-like shape with temperature-control-medium channels arranged in the plate-like shape.

With regard to further technical features and advantages of the battery module according to the invention, reference is hereby made explicitly to the explanatory remarks in connection with the receptacle according to the invention, the figures and also the description of the figures.

BRIEF DESCRIPTION OF THE DRAWINGS

Further advantages and advantageous configurations of the subject-matters according to the invention are illustrated by the drawings and elucidated in the following description, in which connection the described features—individually or in any combination—may be a subject-matter of the present invention, unless the contrary results unequivocally from the context. In this connection it is to be noted that the drawings have only descriptive character and are not intended to restrict the invention in any way. Shown are.

DETAILED DESCRIPTION

Figure 1:
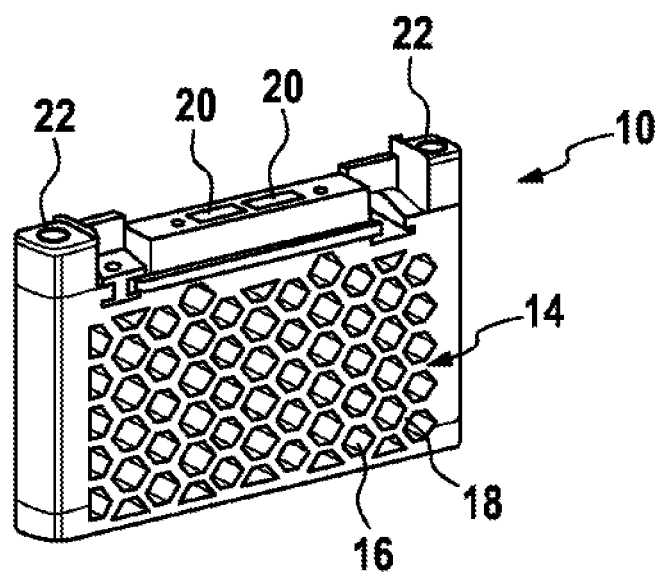
FIG. 1 a schematic view of an end plate for a receptacle according to the invention, obliquely from in front.
Figure 2:
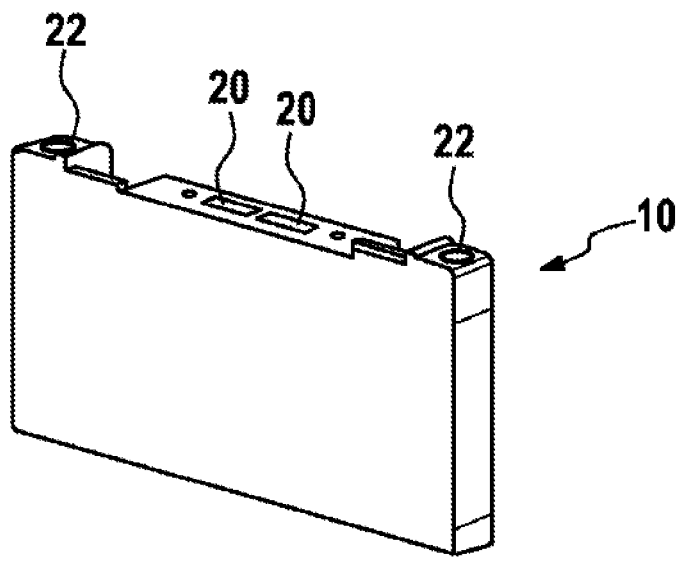
FIG. 2 a schematic view of the end plate from FIG. 1, obliquely from behind.

In FIGS. 1 and 2 an end plate 10 is shown which, together with a second end plate 10, for example of identical construction, may serve to press in, at least partially, at least one battery cell 12, in particular a plurality of battery cells 12, as described in detail below. For this purpose, a battery cell 12 or the plurality of battery cells 12 can be arranged, in particular, between the end plates 10.

The end plate 10 may have been configured, for example, from a synthetic material and, in non-limiting manner, as an injection-molded part. With respect to the end plates 10, it is furthermore shown in FIGS. 1 and 2 that said end plates exhibit, at least partially, a honeycomb-like structure 14. In this case the structure 14 may, for instance, have been formed by hexagonal recesses 16 which have been arranged adjacent to their borders or frames 18, in order in this way to yield a honeycomb pattern which may extend substantially over the entire surface.

Moreover, the end plate 10, also designated as adapter plate, may exhibit recesses 20, in order to be able to grip and handle the receptacle 10 or the finished battery module with a suitable tool in manufacture or in the course of repair.

In FIGS. 1 and 2 it is shown, furthermore, that the end plate 10 exhibits two sockets 22 which, for instance, have been formed from a metallic material and/or which may pass completely through the end plate 10. The sockets 22, for example, have been injection-molded or pressed into the end plate 10.

Figure 3:
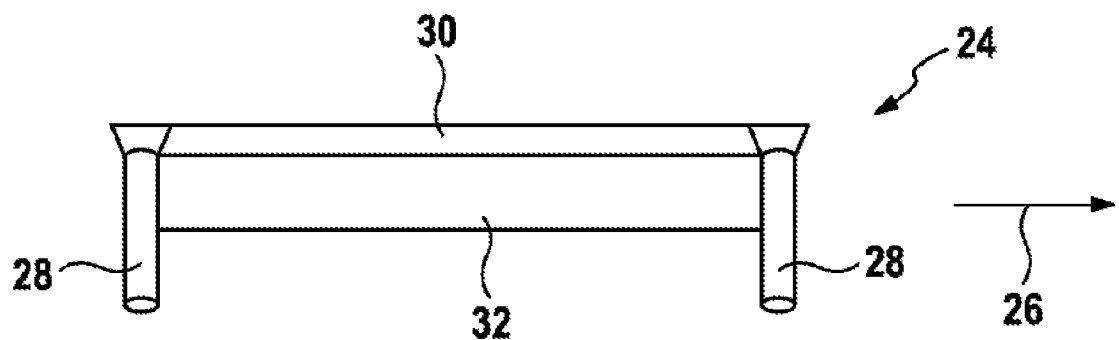
FIG. 3 a schematic view of a connecting means for a receptacle according to the invention, from the side.

In FIG. 3 a connecting means 24 is shown which may serve to connect, for example, two end plates 10 to one another. The connecting means 24 is rod-shaped and exhibits two plug-in elements 28 arranged substantially perpendicular to its direction of extent, which is intended to be illustrated by the arrow 26. The plug-in elements 28 serve, in particular, to be able to engage with the sockets 22 of the end plates 10 for the purpose of fixing the latter, as described below. The connecting means 24 may have been formed from a metallic material, for example.

Moreover, the invention may provide that the connecting means 24 exhibits two shanks 30, 32 arranged substantially at right angles to one another, in order to be able to fix the at least one battery cell 12 securely in a finished module. As a result, together with the end plates 10 a three-dimensional fixing of the battery cells 12 can be made possible.

Figure 4:
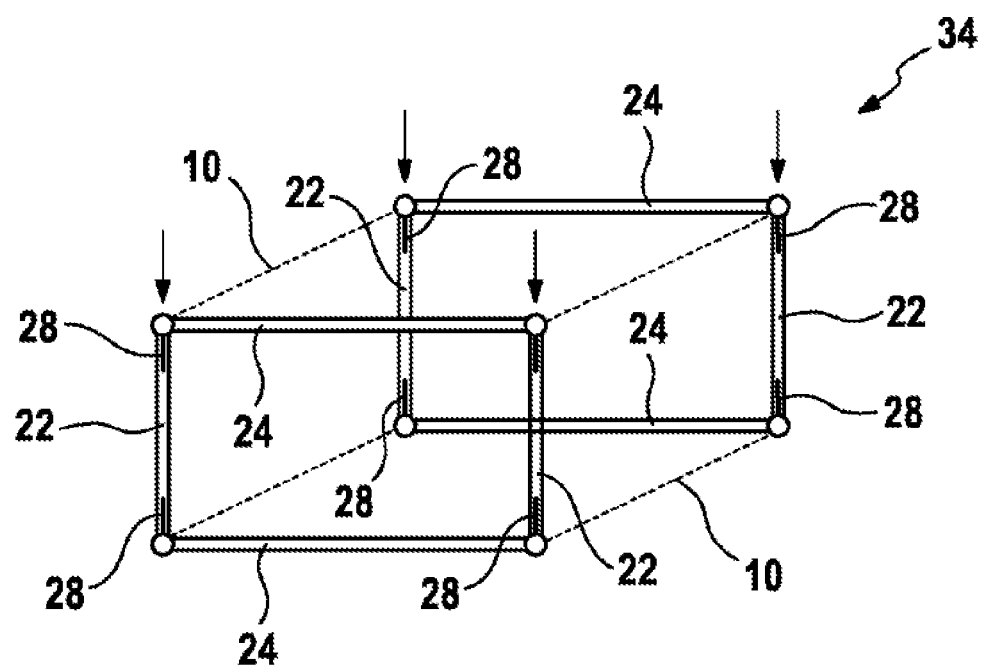
FIG. 4 a schematic representation of a configuration of a receptacle according to the invention.

Shown purely schematically in FIG. 4 is a receptacle 34 for the at least partially pressing accommodation of at least one battery cell 12 for a battery module, said receptacle exhibiting at least two of the end plates 10 which can be arranged on two opposing sides of at least one battery cell 12. The end plates 10 are shown purely schematically in FIG. 4, wherein, in particular, the sockets 22 are to be discerned. According to FIG. 4 it is shown that the end plates 10 have been connected by a total of four rod-like connecting means 24, fixed to the end plates 10, in such a manner that the respective plug-in elements 28 of the connecting means 24 engage with the sockets 22 for the purpose of fixing the connecting means 24 to the end plates 10. In this figure it is shown that the sockets 22 are aligned substantially at right angles to the direction of extent of the connecting means 24, said sockets 22 furthermore extending from a top region to a bottom region of the end plates 10 and therefore, in a finished battery module, from a top region to a bottom region of the battery cells 12.

For the purpose of producing the receptacle, the connecting means 24 or, to be more exact, the plug-in elements 28 thereof merely need to be pushed or plugged into the end plates 10 or, to be more exact, the sockets 22 thereof, as is intended to be indicated by the arrows in FIG. 4. It is consequently evident that the battery cells 12 can be held securely in the receptacle in straightforward manner.

Figure 5:
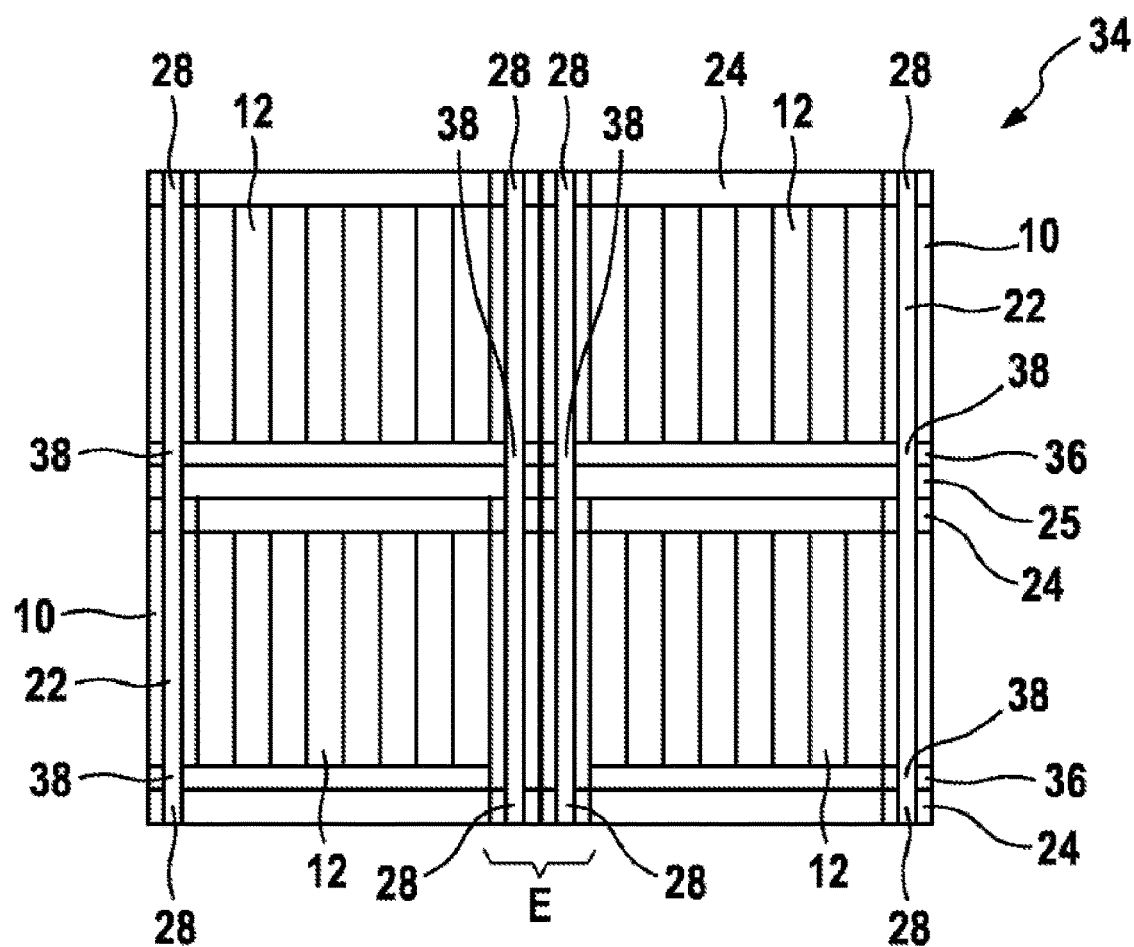
FIG. 5 a schematic representation of a further configuration of a receptacle according to the invention.

In FIG. 5 a further configuration of a receptacle 34 is shown, with battery cells 12 already arranged in the receptacle 34 being shown in FIG. 5. In FIG. 5 a configuration is represented in which end plates 10 arranged in pairs have been provided which have partially been positioned one above another with sockets 22 arranged in alignment. Moreover, it is shown in FIG. 5 that end plates 10 arranged in pairs have been provided which have partially been positioned side by side with sockets 22 arranged in parallel. As a result, a receptacle 34 that is suitable for a large number of battery modules can be created in straightforward manner. In detail, a total of four modules can be accommodated by the receptacle shown in FIG. 5, it definitely being possible for such a configuration to be expanded in height and/or width and/or depth, in particular through the provision of further end plates 10 arranged in pairs.

In this connection FIG. 5 shows, furthermore, that the plug-in elements 28 may have been designed, at least partially for example, with such a length that said plug-in elements can be positioned, for instance, in two bushings 22 of different end plates 10. In this configuration, between two modules positioned one above the other, for example, instead of further connecting means 24 merely separating elements 25 may have been provided which fix the battery cells 12 but do not need to exhibit any plug-in elements 28 but merely need to exhibit an opening for guiding the plug-in elements 28 or a plug-in element 28 through. In the configuration from FIG. 5, a respective plug-in element 28 of an upper connecting means 24 can, for example, pass through an upper end plate 10 and extend into the lower end plate 10 or, to be more exact, the socket 22 thereof, whereas a plug-in element 28 of the lower connecting means only needs to extend into the lower end plate 10 or, to be more exact, into the socket 22 thereof, or conversely. The individual modules may furthermore have been fixed to one another by fixing means.

Moreover, the region labeled with E in FIG. 5 may include an end plate 10 if, for example, a connecting means 24 with three plug-in elements 28 has been provided. Alternatively, two separate end plates 10 may find application.

Furthermore, it is shown that temperature-control elements 36 have been provided which may exhibit sockets 38 arranged in alignment with the sockets 22 of the end plates 10, in which case the plug-in means 28 of at least one connecting means 24 lead through the sockets 38 of the temperature-control element 36. In this configuration, a particularly simple fixing of temperature-control elements 36 in the receptacle 34 described above is possible. Alternatively, the temperature-control elements 36 may have been fixed in some other way, for instance to the battery cells 12.

A temperature-control element 36 for use in a receptacle 34 described above is shown in FIG. 6. The temperature-control element 36 has been configured, in particular, with a plate-like base body 40 which may have been formed from extruded aluminum, for example. Optionally, an insulating material, such as a plastic sheath for instance, may be present, in order to isolate the base body 40 electrically from the battery cells 12. The base body 40 exhibits a structure for guiding a temperature-control medium, such as a coolant for instance, as is intended to be represented by the arrows. In this case the structure of the temperature-control element may exhibit substantially parallel channels 44, in which case a U-shaped rerouting, for example, can be realized from a sealing means 42, for instance, for example consisting of a synthetic material. Furthermore, a further sealing means 46, for example consisting of a synthetic material, may exhibit an input 48 and an output 50 for conducting the temperature-control medium in and out, respectively.

Figure 6:
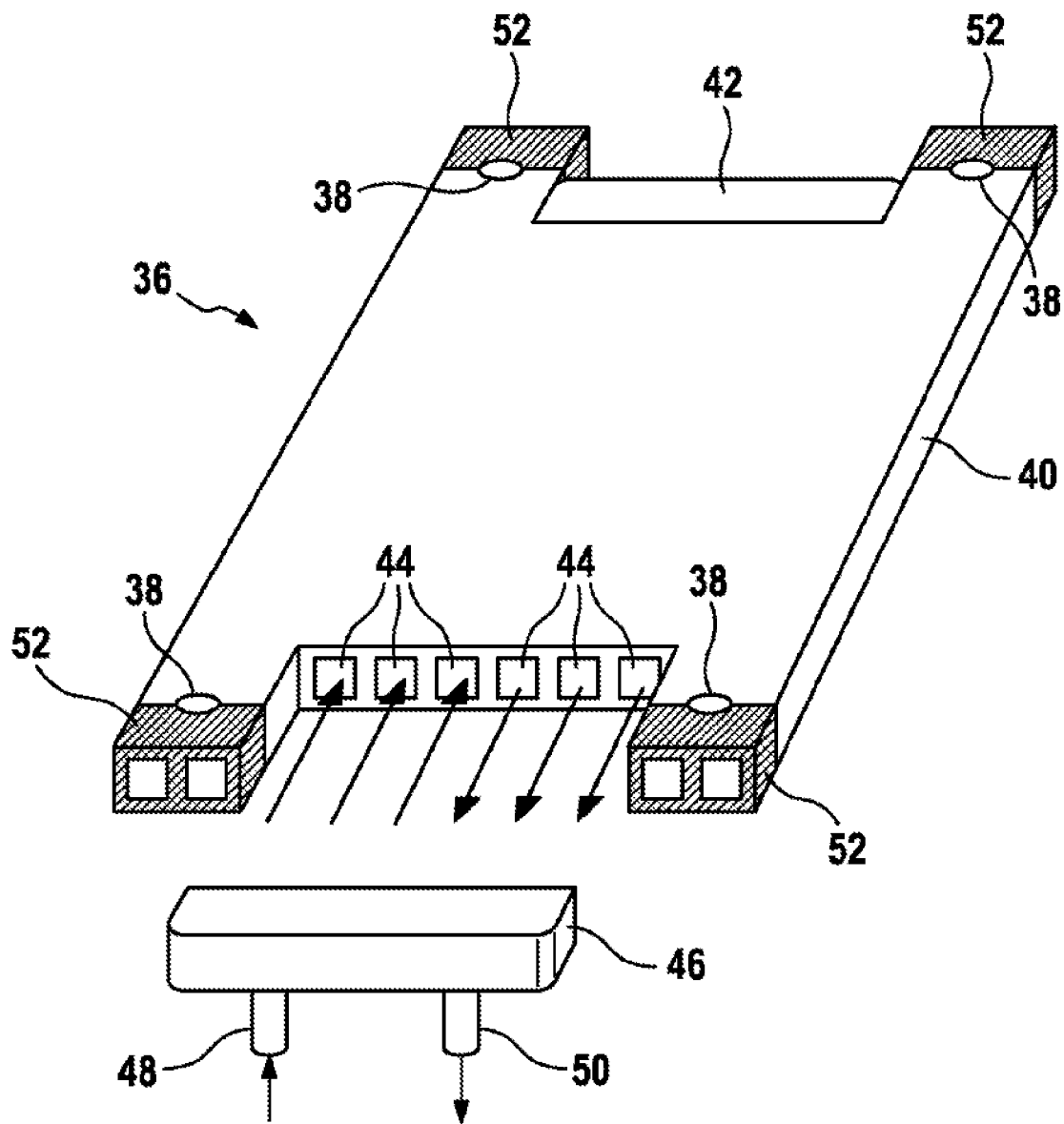
FIG. 6 a schematic view of a temperature-control element for a receptacle according to the invention, obliquely from above.

In FIG. 6 the sockets 38 can, moreover, be discerned which can accommodate the plug-in means 28, as described above. Alternatively, the invention may provide that the temperature-control element is able to act as connecting means 24 and exhibits, instead of the sockets 38, plug-in means 28 in order to be fixed to the end plates 10 and to fix the end plates 10 to one another.

In addition, crumple zones 52 are indicated which may have been provided at the four corners of the base body 40 and which can reduce an escape of temperature-control medium in the event of damage.

The invention claimed is:

1. A receptacle (34) for at least partially pressing accommodation of at least one battery cell (12) for a battery module, said receptacle (34) comprising at least two end plates (10) configured to be arranged on two opposing sides of the at least one battery cell (12), wherein the end plates (10) are connected by a plurality of connecting means (24) fixed to the end plates (10), each of the connecting means having at least two plug-in elements (28) that, for fixing the connecting means (24) to the end plates (10), engage with sockets (22) of the end plates (10) extending in a plane arranged substantially at right angles to the direction of extent of the connecting means (24), wherein the connecting means and the plug-in elements are integrally formed, and wherein the sockets completely pass through the end plates.

2. The receptacle (34) as claimed in claim 1, characterized in that the receptacle comprises at least four end plates (10) arranged in pairs, two of which, in each instance, have been positioned one above the other with sockets (22) arranged in alignment.

3. The receptacle (34) as claimed in claim 1, characterized in that the receptacle comprises at least four end plates (10) arranged in pairs, two of which, in each instance, have been positioned side by side with sockets (22) arranged in parallel.

4. The receptacle (34) as claimed in claim 1, characterized in that the sockets (22) are formed from a metallic material.

5. The receptacle (34) as claimed in claim 1, characterized in that the end plates (10) are formed from a synthetic material.

6. The receptacle (34) as claimed in claim 1, characterized in that the end plates (10) have, at least partially, a honeycomb-like structure (14).

7. The receptacle (34) as claimed in claim 1, characterized in that the connecting means (24) are formed from a metallic material.

8. A battery module with at least one battery cell (12), characterized in that the battery module includes at least one receptacle (34) as claimed in claim 1 for accommodating the at least one battery cell (12).

9. The battery module as claimed in claim 8, further comprising at least one temperature-control element (36), said temperature-control element (36) including sockets (38) arranged in alignment with sockets (22) of at least one end plate (10), wherein the plug-in elements (28) of at least one connecting means (24) lead through the sockets (38) of the temperature-control element (36).

10. The battery module as claimed in claim 8, further comprising at least one temperature-control element (36), said temperature-control element (36) including sockets (38) arranged in alignment with sockets (22) of at least one end plate (10), wherein at least one temperature-control element (36) serves as a connecting means (24).

* * * * *